March 22, 1932.　　　T. ROED　　　1,850,566
SEALING DEVICE
Filed March 14, 1928　　2 Sheets-Sheet 1
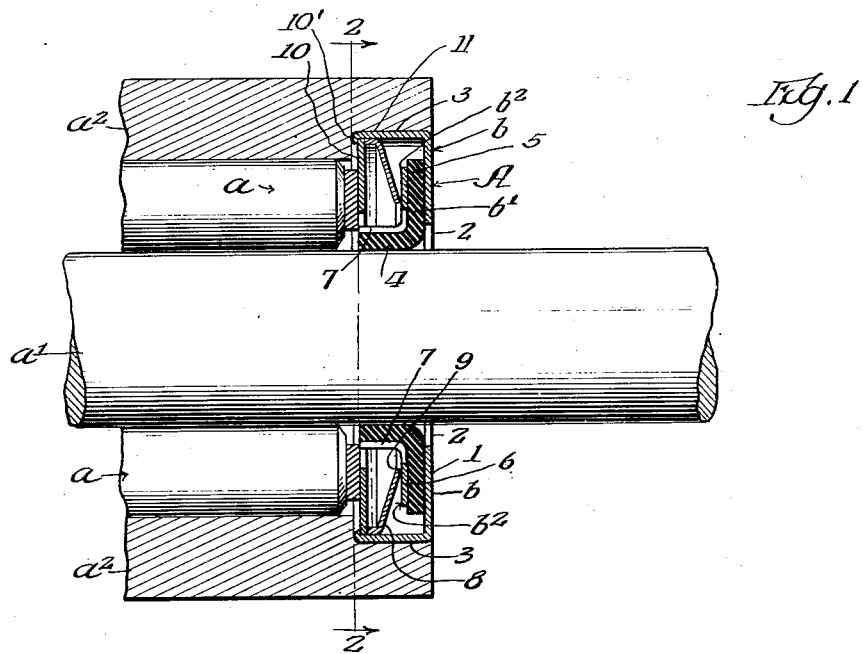
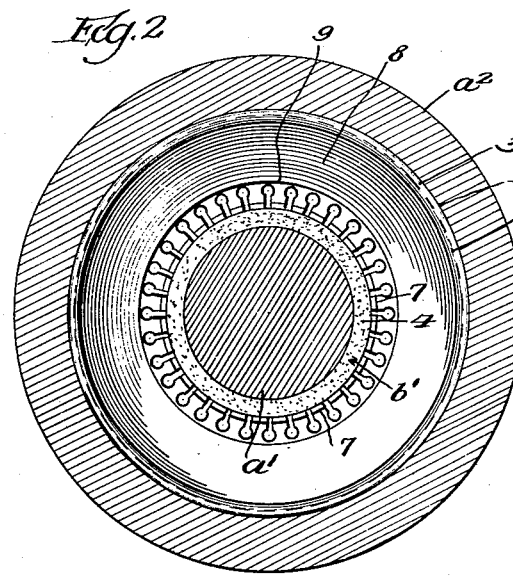
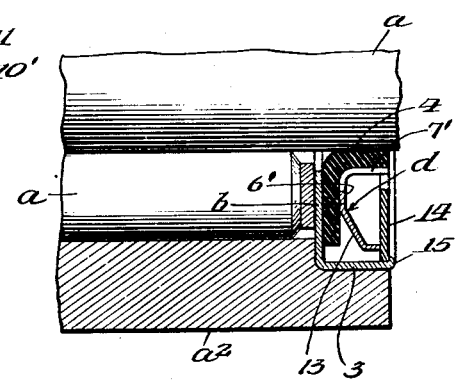
Inventor
Thorvald Roed,
By Geo. E. Waldo
Attÿ.

March 22, 1932.  T. ROED  1,850,566
SEALING DEVICE
Filed March 14, 1928   2 Sheets-Sheet 2
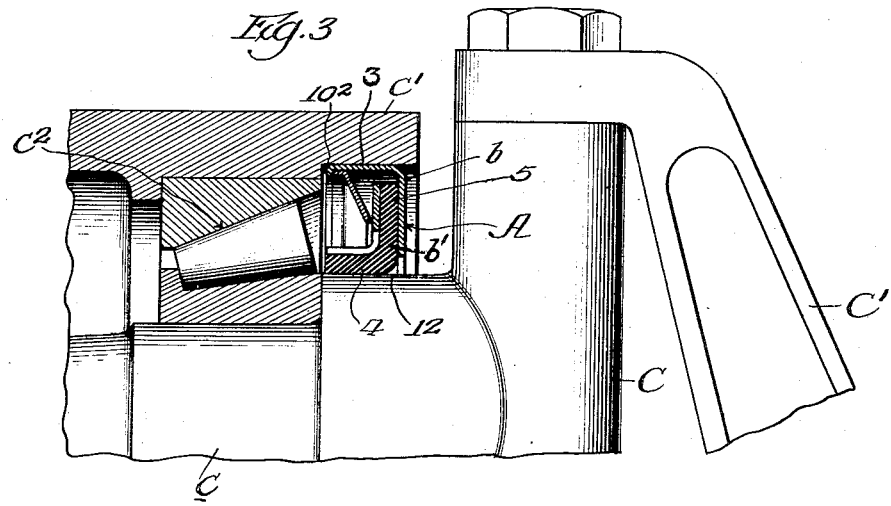
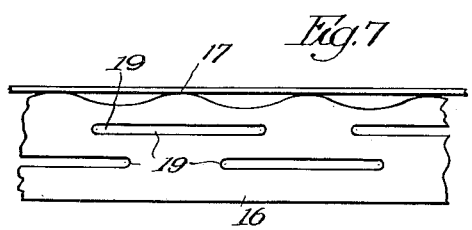
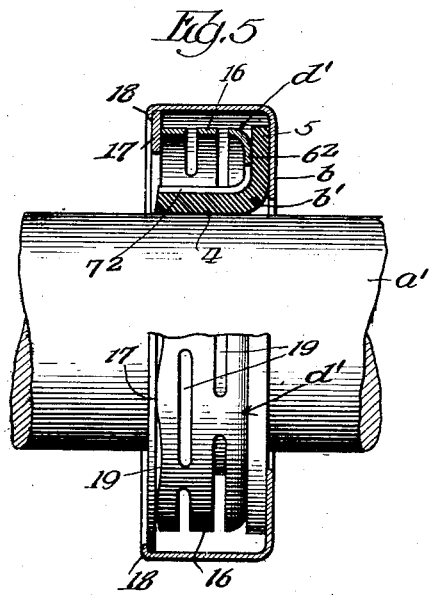
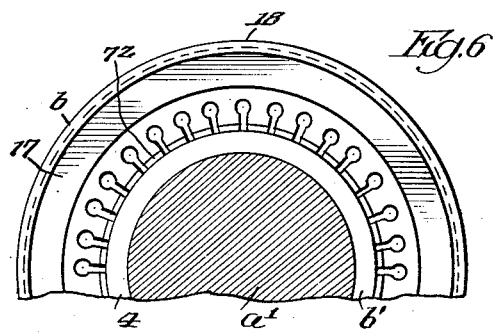
Inventor:—
Thorvald Roed
By G.E. Valdo
Atty.

Patented Mar. 22, 1932

1,850,566

UNITED STATES PATENT OFFICE

THORVALD ROED, OF CHICAGO, ILLINOIS

SEALING DEVICE

Application filed March 14, 1928. Serial No. 261,547.

My invention relates to sealing devices designed and adapted to prevent leakage of lubricant used on bearings.

The object of the invention is to provide a device for the purpose specified, which will be simple in construction, which will occupy only small space, which will be effective for its designed purpose and which may be manufactured at relatively small cost as compared with other devices for the same purpose of which I have any knowledge.

To effect the objects of the invention, a sealing device embodying my invention and improvements comprising a casing having a flat disk portion provided with an opening adapted to receive a relatively rotatable member and preferably proportioned to permit relative floating movement of said casing and rotatable member, and a flange at the outer edge of said disk portion adapted to be seated in an annular opening in a relatively non-rotatable part or member to form a tight joint, a packing member of suitable material comprising a sleeve portion adapted to fit a bearing on said relatively rotatable member and a collar portion adapted to contact with the disk portion of the casing, and pressure means applied to said packing member adapted to hold the sleeve and disk portions thereof in frictional engagement with the bearing on said relatively rotatable member and with the disk portion of the casing, respectively.

The invention also comprises the various other features, combinations of features and details of construction hereinafter described and claimed.

In the accompanying drawings in which my invention is fully illustrated:

Figure 1 is a sectional elevation of a sealing device embodying my invention and improvements shown as applied in use for sealing a usual type of roller bearing for rotatably mounting a shaft in a relatively fixed member, shown in section.

Figure 2 is a sectional end view on the line 2—2 of Fig. 1.

Figure 3 is a fragmentary view showing a sealing device embodying my invention and improvements as applied in use for sealing a Timken bearing, applied for mounting a front wheel of a motor vehicle on the journal formed on a steering knuckle pivoted to the front axle of the vehicle.

Figure 4 is a fragmentary view substantially similar to Fig. 1, showing a modified form of sealing device of my invention.

Figure 5 is a view substantially similar to Fig. 1, illustrating a second modification.

Figure 6 is a fragmentary end view from the left side of Fig. 6; and

Figure 7 is a fragmentary view showing the compression member forming part of the sealing device shown in Figs. 5 and 6, developed.

Describing the invention with particular reference to Figs. 1 and 2 of the drawings, in the first instance, in which I have shown what I now consider to be the preferable embodiment of my invention, A designates my improved sealing device as a whole, shown as applied in use for sealing a usual type of roller bearing, designated as a whole $a$, for mounting a shaft $a'$ in a housing $a^2$. Said shaft $a'$ and housing $a^2$ exemplify any relatively rotatable parts or members to which the bearing $a$ may be applied.

As shown, said sealing device A comprises a casing designated as a whole $b$, comprising a flat disk portion 1 provided with a central hole or opening 2 adapted to receive the shaft $a'$ and preferably proportioned to provide for contemplated floating action of said shaft and housing relative to each other, and a cylindrical flange portion 3 formed at the outer edge of said disk 1.

My improved sealing device also comprises a packing member of suitable material designated as a whole $b'$, comprising integral sleeve and collar portions 4 and 5, the sleeve portion being fitted to and in use being compressed into close frictional engagement with the shaft $a'$, and the collar portion 5 being adapted to rest in contact with the disk portion 1 of the casing $b$.

My improved sealing device also comprises pressure means applied to said packing member $b'$ adapted to hold the sleeve and collar portions 4 and 5 thereof in desired frictional engagement with the shaft $a'$ and with the inner surface of the disk portion 1 of the casing $b$, respectively.

In accordance with my invention, said pressure means comprises what may be referred to as a compression member designated as a whole $b^2$, comprising a washer 6 adapted to contact with the collar portion 5 of the packing member $b'$, formed at the inner edge of which are spring fingers 7 applied to the sleeve portion 4 of said packing member and adapted to compress it into desired frictional engagement with the shaft $a'$. Said pressure means also comprises means in association with the washer portion 6 of the compression member $b^2$ applied to said packing member, for exerting pressure upon said member 6 adapted to maintain the collar portion 5 thereof in close frictional engagement with the disk portion 1 of the casing $b$, said means consisting, as shown, of a dished washer 8 made of resilient sheet metal, provided with a central opening 9 adapted to receive the sleeve portion 4 of the packing member and the compression finger 7 thereon preferably with sufficient clearance to permit contemplated floating movement of the shaft $a'$ and housing $a^2$ relative to each other. Said washer 8 is assembled under desired compression with its concave side disposed outwardly, the base and apex thereof reacting against a disk 10 secured in the open side of the casing $b$, and the washer portion 6 of the compression member $b^2$. As shown, said disk 10 is secured in position against the thrust of the spring washer 8 by means of a flange or shoulder 10' formed at the edge of the flange portion 3 of the casing $b$. Said flange or shoulder can be formed in a simple manner by swaging the extreme edge of the flange 3 over the edge of said disk, when in position corresponding to desired compression of the spring washer 8.

In use, leakage of oil, grease or other lubricant past the casing $b$ of the sealing device is prevented by seating said casing in a recess or opening formed in one of the relatively rotatable members to which the device is applied so as to form a tight joint, as for example, see particularly Fig. 1, in a recess 11 formed in the housing $a^2$ in which the shaft $a'$ is rotatably mounted.

With the described construction, it is obvious that my improved sealing device A will effectively prevent leakage of lubricant from the space in which the roller bearing $a$ is confined. Particular advantages inherent in my improved sealing device is that all of the parts thereof may be formed and assembled quickly and at relatively small cost by usual stamping and swedging operations and, also, that said device is entirely self-contained.

In assembling my improved sealing device, the final operation consists in swedging over the edge of the flange 3 to form the shoulder 10' by which the disk 10 is secured in the casing $b$. But before doing this, said spring washer is subjected to compression corresponding to desired pressure to which the collar portion 5 of the packing member $b'$ will be subjected in use, in which position it will be locked when the shoulder 10' is formed.

For purposes of definite illustration, I have also shown in Fig. 3, a sealing device constructed substantially in accordance with the disclosure of Figs. 1 and 2, as applied in use to the bearing of the front wheel of an automobile.

Referring to Fig. 3, in which the sealing device is secured in the rotatable hub of the wheel instead of in a fixed housing, C designates the steering knuckle on which the journal $c$ for mounting the front wheel of an automobile is formed, said knuckle being pivoted to the front axle $C'$, in a usual manner. As shown, the hub $c'$ of the wheel is mounted on the journal $c$ by a roller bearing of a familiar type indicated at $c^2$ and the joint between the relatively rotatable journal $c$ and hub $c'$ is sealed by means of my improved sealing device A, the casing $b$ of which is seated in the recess 11 formed in the end of the hub $c'$ and the sleeve portion 4 of the packing member $b'$ engaging a cylindrical surface 12 at the base of the journal $c$, said sealing device thus effectively preventing leakage between said journal $c$ and hub $c'$.

When used for sealing a roller bearing of a familiar type, the disk 10 may be omitted, the base of the spring washer 8 reacting directly against a shoulder formed by swaging over the extreme edge of the flange 3 of the casing $b$, as shown at $10^2$.

As a modification of my improved sealing device, I contemplate a construction in which the spring washer 8 by means of which pressure is applied to the packing member, instead of forming a separate part forms an integral part of the compression member $b^2$ which contacts directly with the collar portion 5 of said packing member $b'$.

This modification is shown in Fig. 4 of the drawings and, excepting as hereinafter particularly described and pointed out, is of the same construction as the sealing device shown in Figs. 1 to 3, previously described, and will be readily understood from an examination of the drawings, without a further description thereof in detail, similar parts thereof being designated by the same reference characters as in Figs. 1 to 3.

As shown in Fig. 4, pressure is adapted to be applied to the sleeve and collar portions 4 and 5 of the packing member $b'$ by means of a member designated as a whole $d$, which comprises a disk portion 6' adapted to bear against the collar portion 5 of said packing member, and provided with an opening to receive the sleeve portion 4 of said packing member, formed on which, surrounding said opening therein, are spring fingers 7' adapted to closely engage the sleeve portion 4 of said packing member and to compress the same into desired frictional engagement with the member $a'$. Said pressure member also comprises a portion 13 which forms a marginal extension of the disk portion 6' and which is dished in substantially the same manner as the dished washer 8 in the preferred form of device, the outer edge of which rests in contact with a ring 14 secured in the open side of the casing $b$, in any suitable manner, preferably by swedging over the outer edge of the flange 3 of the casing $b$, so as to form an abutment or shoulder for the ring 14, as shown at 15, substantially in the same manner as the disk 10 is secured in position, as shown in Figs. 1 and 2.

With the described construction, it is obvious that the member $d$ will be connected to the packing member $b'$ so as to move therewith and, in order to provide for contemplated floating movement of the members $a'$, $a^2$, relative to each other, it is necessary that the diameter of the pressure member $d$ shall be less than the inside diameter of the casing $b$.

As a further modification of my improved sealing device, instead of the means shown in Figs. 1 to 3, inclusive, and in Fig. 4, for applying pressure to the packing member, my invention contemplates the use of a pressure member substantially as shown in Figs. 5, 6 and 7 of the drawings, in which said compression member, designated as a whole $d'$, comprises a disk portion $6^2$ provided with a hole or opening adapted to receive the rotatable member $a'$ and the packing member $b'$ formed at the inner edges of which are spring fingers $7^2$ adapted to fit over the sleeve portion 4 of said packing member and to compress the same into close frictional engagement with the rotatable member $a'$. Said pressure member also comprises an outer portion 16 which forms a marginal extension of the disk portion $6^2$ thereof and which projects toward the open side of the casing $b$ of said sealing device, and in use, reacts against a ring 17 secured in the open side of the casing $b$ of the device. As shown, this is effected by swedging over the edge of the flange portion 3 of the casing $b$ to form a bead or shoulder 18 against which said ring or collar 17 rests.

The pressure member $d'$ is made of thin, resilient sheet metal, preferably hard sheet steel or bronze, and the outer portion 16 thereof is rendered resilient when subjected to axial stresses, by forming overlapping circumferential slots 19 therein, thus rendering it compressible.

With the described construction it is obvious that by properly proportioning the parts of the sealing device, desired pressure may be exerted on the washer portion 5 of the packing member through endwise compression of the spring member 16 of said pressure device.

As in the modification shown in Fig. 4, the pressure member $d'$ will move with the packing member and to provide for desired relative floating movement of the rotatable member $a'$ and the surrounding housing, it will be necessary to make the spring portion 16 of the pressure member smaller than the inside diameter of the flange portion 3 of the casing $b$.

I claim:

1. In a sealing device, the combination of a casing comprising a flat disk portion provided with an opening adapted to receive one of relatively rotatable members, and a flange at the outer edge of said disk portion adapted to be seated in an annular opening in one of said members to form a tight joint, a packing member of suitable material comprising a sleeve portion adapted to fit a bearing on one of said relatively rotatable members, and a collar portion which contacts with the disk portion of the casing, and pressure means applied to said packing member comprising a washer applied to the collar portion thereof, spring fingers thereon applied to the sleeve portion thereof, and a spring member applied to the washer portion of said pressure member made of suitable sheet material assembled under compression and reacting against a rigid part of the device.

2. In a sealing device, the combination of a casing comprising a flat disk portion provided with an opening adapted to receive one of relatively rotatable members, and a flange at the outer edge of said disk portion adapted to be seated in an annular opening in one of said members to form a tight joint, a packing member of suitable material comprising a sleeve portion adapted to fit a bearing on one of said relatively rotatable members, and a collar portion which contacts with the disk portion of the casing, and pressure means applied to said packing member comprising a washer applied to the collar portion thereof, spring fingers thereon applied to the sleeve portion thereof, and a spring member applied to the washer portion of said pressure member comprising a dished disk of suitable resilient material assembled under compression with its concave side disposed outwardly and its base reacting against a rigid part of the device.

In witness that I claim the foregoing as my invention, I affix my signature this 9th day of March, A. D. 1928.

THORVALD ROED.